(No Model.) 2 Sheets—Sheet 1.

T. P. SULLIVAN.
MACHINE FOR DELINTING COTTON SEED.

No. 397,448. Patented Feb. 5, 1889.

(No Model.) 2 Sheets—Sheet 2.

T. P. SULLIVAN.
MACHINE FOR DELINTING COTTON SEED.

No. 397,448. Patented Feb. 5, 1889.

WITNESSES
INVENTOR
Thomas P. Sullivan
by C D Moody atty

UNITED STATES PATENT OFFICE.

THOMAS P. SULLIVAN, OF ST. LOUIS, MISSOURI.

MACHINE FOR DELINTING COTTON-SEED.

SPECIFICATION forming part of Letters Patent No. 397,448, dated February 5, 1889.

Application filed March 2, 1888. Serial No. 265,937. (No model.)

*To all whom it may concern:*

Be it known that I, THOMAS P. SULLIVAN, of St. Louis, Missouri, have made a new and useful Improvement in Machines for Delinting Cotton-Seed, of which the following is a full, clear, and exact description.

The present machine belongs to that class of seed-cleaning machines in which the seed to be cleaned is fed between a revolving brush and a surrounding abrading-surface, and thereby denuded of its lint, hulls, &c., which are then discharged from the machine separately from the denuded seed.

The improved machine is composed, substantially, as follows: A brush, preferably of a conical shape, revolves within a perforated concave of corresponding shape. The lint-bearing seed is fed into the annular space between the brush-surface and the inner face of the concave, and the lint is separated from the seed by reason of the seed being brushed against the concave. A packer is used to work the lint-bearing seed into the annular space, and the lint as it is separated from the seed is withdrawn by means of an exhaust air-blast through the openings in the concave to without the concave, leaving the denuded seed within the annular space described to be ultimately discharged at the farther end thereof. Now, as such machines have heretofore been made, the air-current referred to has been taken into the annular space at the end thereof and thence outward through the perforations in the concave, and as thus constructed difficulty is experienced by reason of the lint remaining and clogging the action of the machine. To obviate this difficulty is a principal feature of this improvement, which consists in so constructing the machine as to enable the air-current to be drawn from the interior of the brush outward and into the annular space, and thence through the concave, by which means the lint is more effectually prevented from adhering to the brush or to the concave, for not only does the air-current move in a more favorable direction for stripping the lint from the tufts of the brush, but it is also distributed more evenly throughout the length of the brush.

The most desirable form of the improvement is exhibited in the annexed drawings, making part of this specification, in which—

Figure 1:
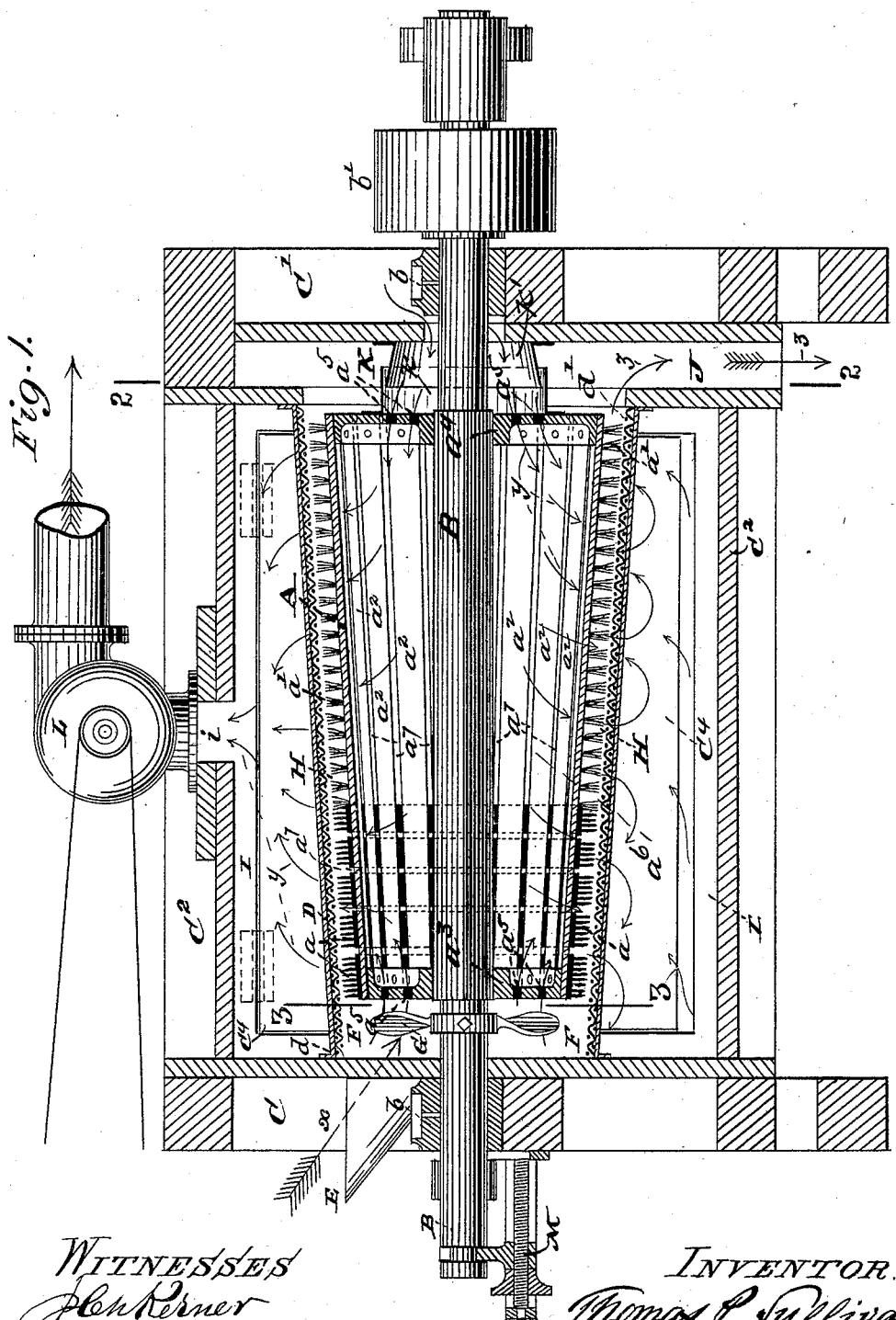
Figure 2:
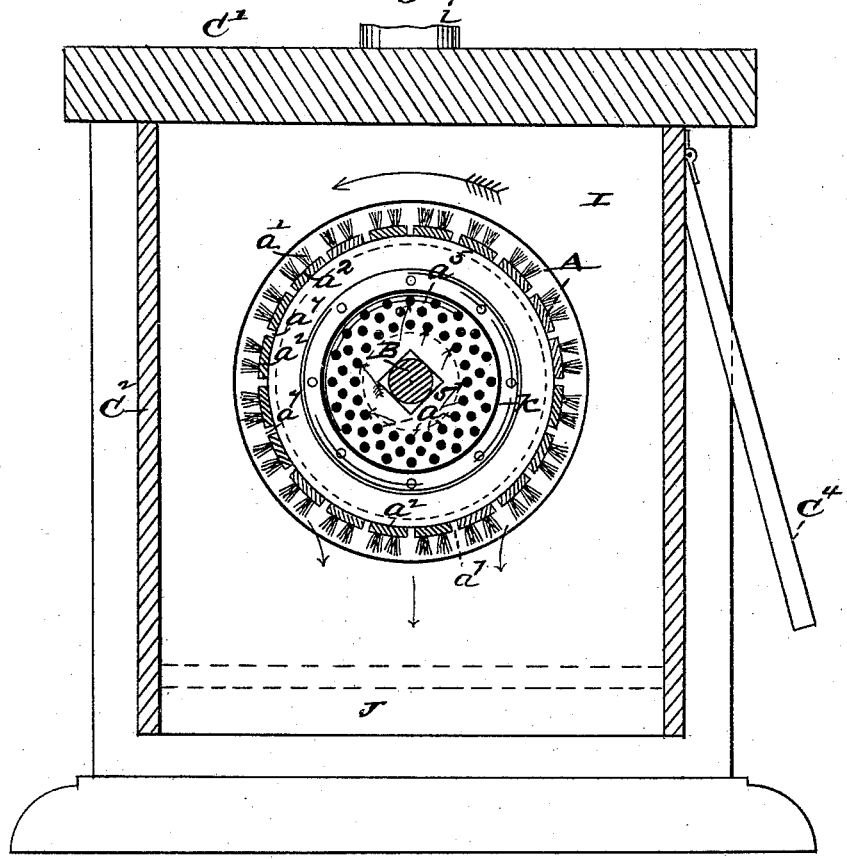
Figure 3:
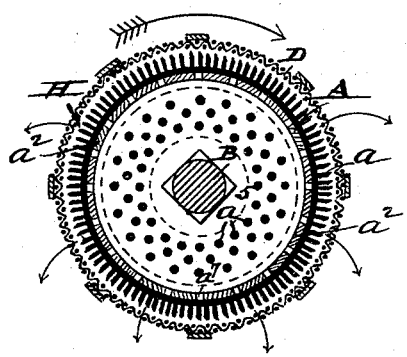

Figure 1 is a vertical longitudinal section of the improved machine, partly in elevation; Fig. 2, a vertical cross-section on the line 2 2 of Fig. 1, and Fig. 3 a cross-section of certain parts on the line 3 3 of Fig. 1.

The same letters of reference denote the same parts.

A represents the brush. It is fastened to the shaft B, which is held and adapted to be rotated in the bearings $b$ $b$ on cross-pieces between the uprights C C' of the machine. Power is communicated to the shaft by means of the pulley $b'$. The concave D is preferably of wire-cloth of a mesh, say, one-fourth inch. The concave at its ends is attached to the casing $C^2$ of the machine. At the end $d$ the concave is closed, saving the inlet E, through which the lint-bearing seed is introduced, as indicated by the arrow $x$, Fig. 1, into the space F. From this space, aided by the packer G, which is attached to and revolves with the shaft B', the seed is worked into the annular space H between the brush and the concave. The concave by reason of its irregular outline coacts with the brush to remove the lint from the seed, and by reason of its open-work nature opportunity is afforded for transferring the lint as it is separated from the annular space H into the space I, which surrounds the concave, and is inclosed by the casing $C^2$, and from the space I the lint is discharged, say, at $i$. The denuded seed works along the annular space H to the end $d'$ of the concave, whence it is discharged into the passage J, as indicated by the arrows $z$. The brush-surface is composed of any suitable material—such as the teeth $a$ or the tufts $a'$ partly of wire and partly of tampico. The teeth, &c., are attached to staves $a^2$, which may be removable from the drums which constitute the frame-work of the brush; but a particular feature of the brush is the provision for the movement of the air-current in the direction described—namely, first, into the interior of the brush and then radially outward through the brush-surface. To this end the end $a^3$, or both ends $a^3$ $a^4$, of the brush are so constructed as to provide inlets $a^5$ for the air to enter into the interior $a^6$ of the brush, and the staves $a^2$ are spaced apart to provide outlets $a^7$, through which the air can escape from the interior $a^6$.

I desire not to be restricted to any particular mode of introducing the air into and withdrawing it from the interior of the brush, but consider the method shown as being the most desirable. The inlets $a^5$ are sufficiently fine to prevent the passage of either the lint-bearing or the denuded seed, and, if desired, additional means—such as the guard K, which is in two parts, one, $k$, attached to the brush, and the other, $k'$, to the casing $C^2$—may be used to prevent the seed from entering the brush interior.

L represents an exhaust-fan attached either directly or indirectly to the casing $C^2$, by means of which the described air-current is induced and the lint removed from the machine. The arrows $y$ indicate the direction of the air-currents. The air can enter the outer casing of the machine at any desired point or points. The casing may, therefore, have a door, $C^4$, which may be opened, as shown.

I claim—

1. The combination of the revolving brush having the air inlets and outlets, as described, the perforated concave, the casing having the inlet for the lint-bearing seed and the outlet for the denuded seed, and the exhaust-fan, substantially as described.

2. In combination with the revolving brush having the air inlets and outlets, as described, the casing having the inlets for the lint-bearing seed and the air-current and the outlets for the lint and the denuded seed, the packer, the perforated concave, and the exhaust-fan, substantially as described.

Witness my hand.

THOS. P. SULLIVAN.

Witnesses:
C. D. MOODY,
J. H. TIERNAN.